US012388179B2

(12) United States Patent
Reneau et al.

(10) Patent No.: US 12,388,179 B2
(45) Date of Patent: Aug. 12, 2025

(54) COMPACT ULTRA-WIDEBAND ANTENNA

(71) Applicant: USA as represented by Secretary of the Army, Washington, DC (US)

(72) Inventors: Jason M. Reneau, Madison, AL (US); Emmanuel D. Bizanis, San Diego, CA (US); Kevin Kassner, Madison, AL (US); Athanasios Petropoulos, Owens Cross Roads, AL (US)

( * ) Notice: Subject to any disclaimer, the term of this patent is extended or adjusted under 35 U.S.C. 154(b) by 153 days.

(21) Appl. No.: 18/462,512

(22) Filed: Sep. 7, 2023

(65) Prior Publication Data

US 2025/0087883 A1 Mar. 13, 2025

(51) Int. Cl.
*H01Q 5/25* (2015.01)
*H01Q 5/335* (2015.01)

(52) U.S. Cl.
CPC ............... *H01Q 5/25* (2015.01); *H01Q 5/335* (2015.01)

(58) Field of Classification Search
CPC ................................ H01Q 5/25; H01Q 5/335
See application file for complete search history.

(56) References Cited

U.S. PATENT DOCUMENTS

| | | | | |
|---|---|---|---|---|
| 9,019,163 | B2 * | 4/2015 | Asanuma | H01Q 9/28 343/702 |
| 11,011,848 | B2 * | 5/2021 | Mancewicz | H01Q 13/085 |
| 11,114,750 | B1 * | 9/2021 | Turner | H01Q 1/1235 |
| 2024/0429615 | A1 * | 12/2024 | Tankielun | H01Q 19/08 |
| 2025/0087883 | A1 * | 3/2025 | Reneau | H01Q 5/335 |

* cited by examiner

*Primary Examiner* — Dameon E Levi
*Assistant Examiner* — Jordan E. DeWitt
(74) *Attorney, Agent, or Firm* — Karen G. Hazzah

(57) ABSTRACT

The disclosure provides a compact ultra-wideband (UWB) antenna comprising a plurality of sub-radiator segments, the plurality of sub-radiator segments being a flare section, an inductive corner section, and a rib section. The inductive corner section is configured to mount to a ground surface and connects the flare section and the inductive corner section. The UWB operates over a wide frequency range of 2-18 GHz with good impedance match, high forward gain, stable phase center, and consistent radiation performance. The UWB antenna further comprises a feed point. The feed point is configured to receive a coaxial connector. The plurality of sub-radiator segments are each optimized to propagate electromagnetic currents during specific frequency ranges within the wide frequency range of 2-18 GHz. Further, the UWB antenna can be a single monolithic material, such as a metallic aluminum.

20 Claims, 12 Drawing Sheets

COMPACT ULTRA-WIDEBAND ANTENNA

FIELD

The present disclosure generally relates to a high gain ultra-wideband antenna, and more specifically, to a compact ultra-wideband antenna that utilizes several sub-radiator segments.

BACKGROUND

Ultra-wideband (UWB) antennas are used in a multitude of fields ranging from telecommunications to aerospace and defense because of their ability to transmit and receive a high number of frequencies with minimal power expenditure. UWB antennas have a fractional frequency range in excess of 50%, with the fractional frequency range being calculated using the following equation:

$$FFR = \frac{f_2 - f_1}{f_c}$$

In the above equation, FFR is fractional frequency range, f2 is upper frequency for antenna operation, f1 is lower frequency for antenna operation, and fc is center frequency for antenna operation.

Examples of commonly studied and researched UWB antennas include a bowtie antenna, log-periodic spiral, Vivaldi, and UWB end-fire. Other designs include planar spirals and biconical antennas. These designs often become too large in size to accomplish a 2-18 GHz frequency range for certain applications that require a low-profile footprint. Wider frequency range designs also create challenges in maintaining a good impedance match (VSWR<2) over the entire frequency range. Also, depending on antenna design and mounting options, a main lobe of the antenna does not always radiate in a desired, end-fire frontal direction. For instance, a spiral UWB antenna would radiate the main lobe orthogonal to a conductive ground surface, while a Vivaldi antenna would have a main lobe parallel to the conductive ground surface. Furthermore, some of the aforementioned UWB antenna options, such as the log-periodic spiral, tend to have electrical phase centers that shift with frequency along the length of the antenna, creating challenges for applications, such as measuring direction of arrival and/or minimizing complexity of calibration. Finally, depending on the application, an antenna can be sensitive to mechanical stresses applied to the entire structure or variations in temperature.

Many desirable attributes of an antenna become unobtainable as operational frequency ranges increase, such as an increase in operational bandwidth. For instance, as the fractional frequency range (FFR) increases, dimensions of the antenna also increase to accommodate for a lower range of the wider operational frequency range. An antenna is typically optimized at specific frequencies at which it resonates. Further, gain rolls off across the operational frequency range, creating challenges for applications that require high gain across an entire operating frequency range. Furthermore, often an antenna has a dielectric material to reduce resonant frequency and resonator size. In specific high-temperature applications, a dielectric constant may shift, altering the material properties and thus reducing radiation efficiency of the antenna. Therefore, there is a need for a compact UWB antenna with optimized antenna features (such as: size, frequency range, gain, VSWR, temperature sensitivity) in order to achieve desirable performance over an entire operational frequency range.

BRIEF SUMMARY

In the preferred embodiment, the present disclosure provides a compact ultra-wideband (UWB) antenna. The compact UWB antenna includes a plurality of sub-radiator segments that collectively direct electromagnetic energy in a generally forward direction. The plurality of sub-radiator segments of the compact UWB antenna are a flare section, an inductive corner section, and a rib section. The flare section of the UWB antenna has a curved parabolic surface. The inductive corner section is configured to mount to a ground surface. The rib section connects the inductive corner section and the flare section and provides structural rigidity. Further, the rib section provides a path for radiofrequency current. Additionally, the rib section is configured to attenuate undesirable electromagnetic modes with high frequency.

BRIEF DESCRIPTION OF THE DRAWINGS

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
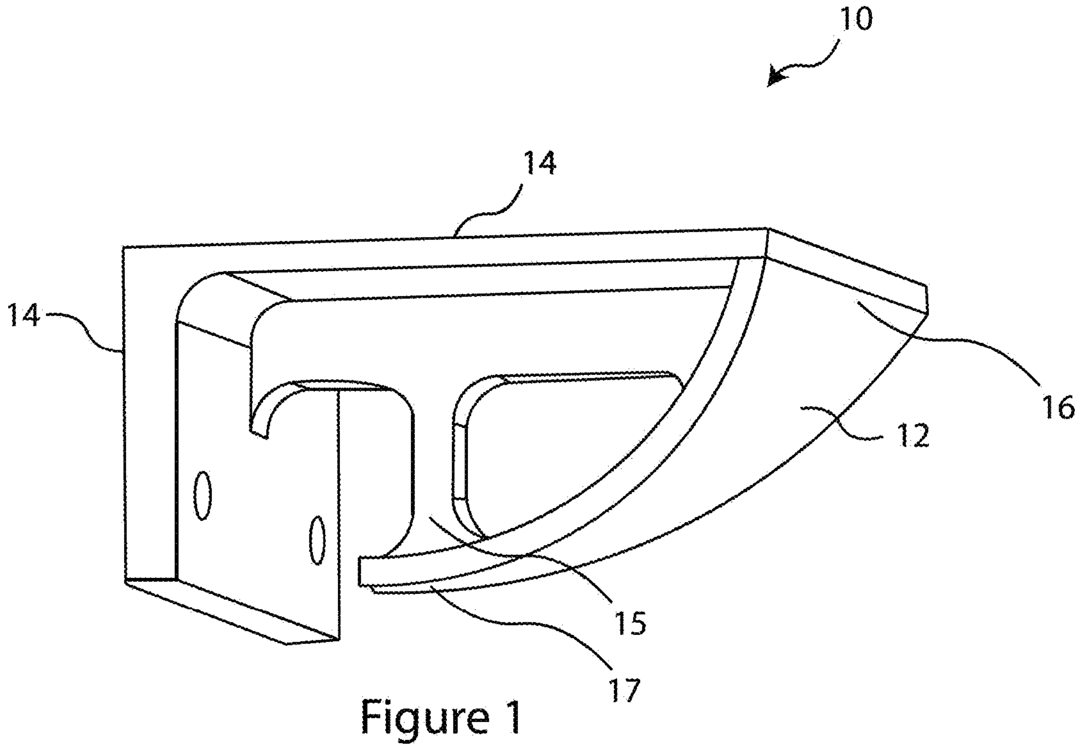
FIG. 1 is an isolated view of a compact UWB antenna.
Figure 2:
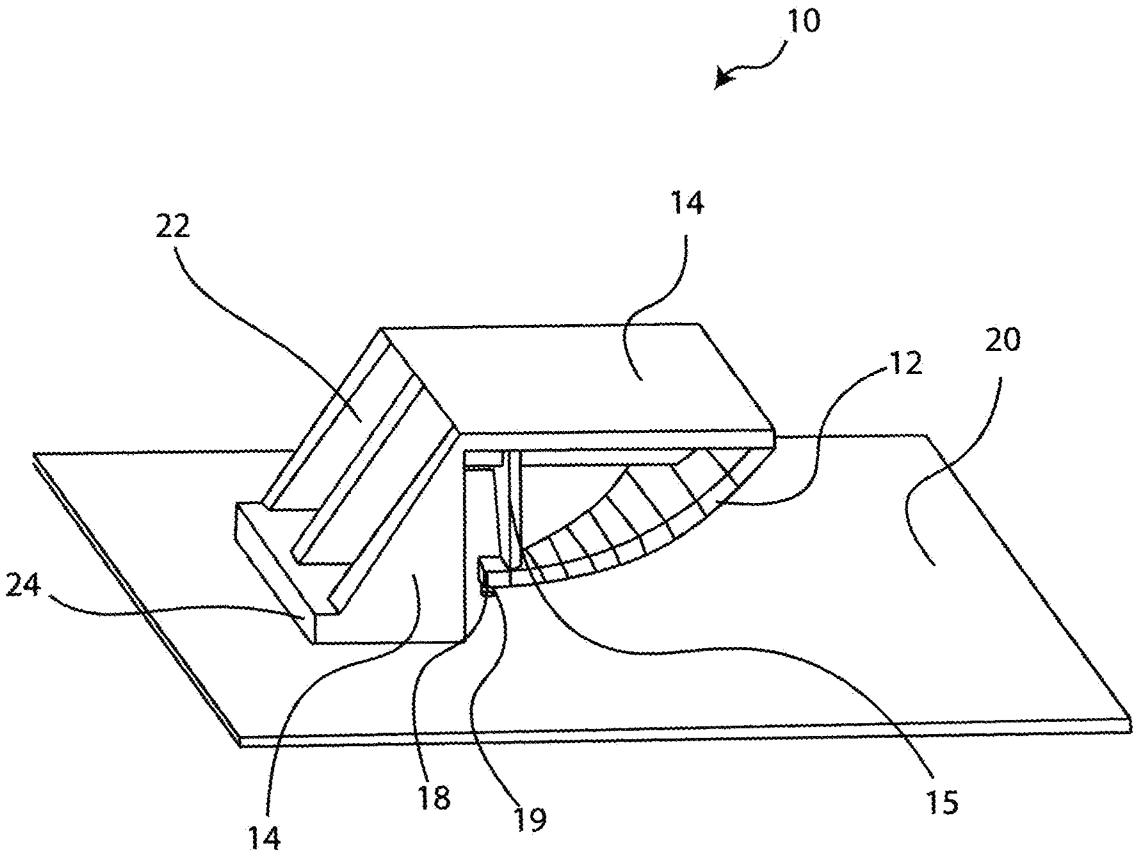
FIG. 2 is isometric view of an alternative embodiment of the compact ultra-wide band (UWB) antenna mounted on a conductive ground surface.
Figure 3:
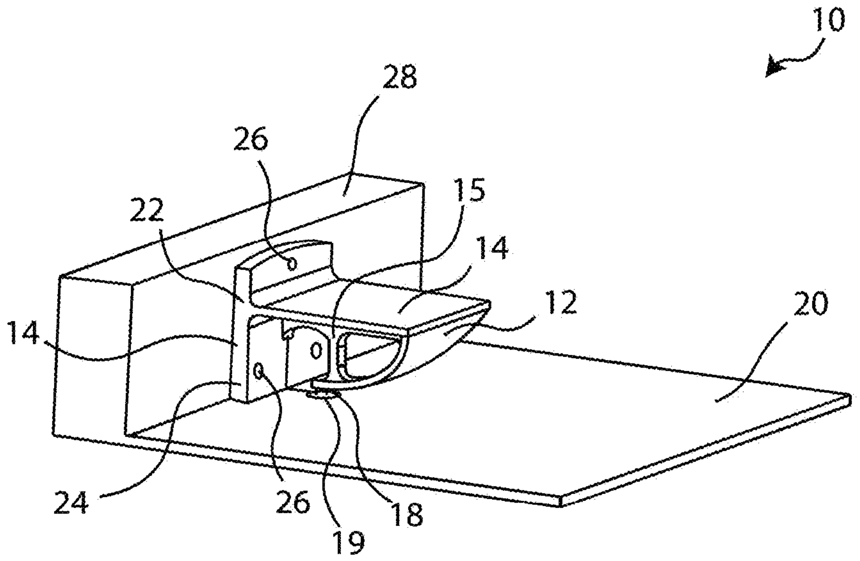
FIG. 3 is an isometric view of an alternative embodiment of the compact UWB antenna mounted on an alternative conductive ground surface.

The present disclosure provides a compact ultra-wide band (UWB) antenna 10 that has a wide operational frequency range while having optimized features such as size, frequency range, gain, VSWR, and resiliency to temperature shifts or mechanical shocks while maintaining a low profile for ease of application. The preferred embodiments of the compact UWB antenna 10 includes a plurality of sub-radiator segments, as shown in FIGS. 1, 2, and 3. The plurality of sub-radiator segments of the compact UWB antenna 10 are a flare section 12, an inductive corner section 14, and a rib section 15. As best shown in FIG. 1, the sub-radiator segments of the preferred embodiment adjoin at a first end portion 16 and a second end portion 17 of the flare section 12. As shown, the first end portion 16 of the flare section adjoins the inductive corner section 14 to the flare section. As shown, the second end portion 17 of the flare section 12 can be spaced apart from inductive corner section 14 while the first end portion 16 adjoins to the inductive corner section. Alternatively, the second end portion 17 adjoins the rib section 15 to the flare section. Each one of the sub-radiator segments can be machined from a single monolithic material (e.g., metallic Aluminum); however, each of the sub-radiator segments have distinct and separate features. Based off design, each one of the plurality of sub-radiator segments is predominantly active during an optimal frequency range, as explained in further detail below.

Figure 4:
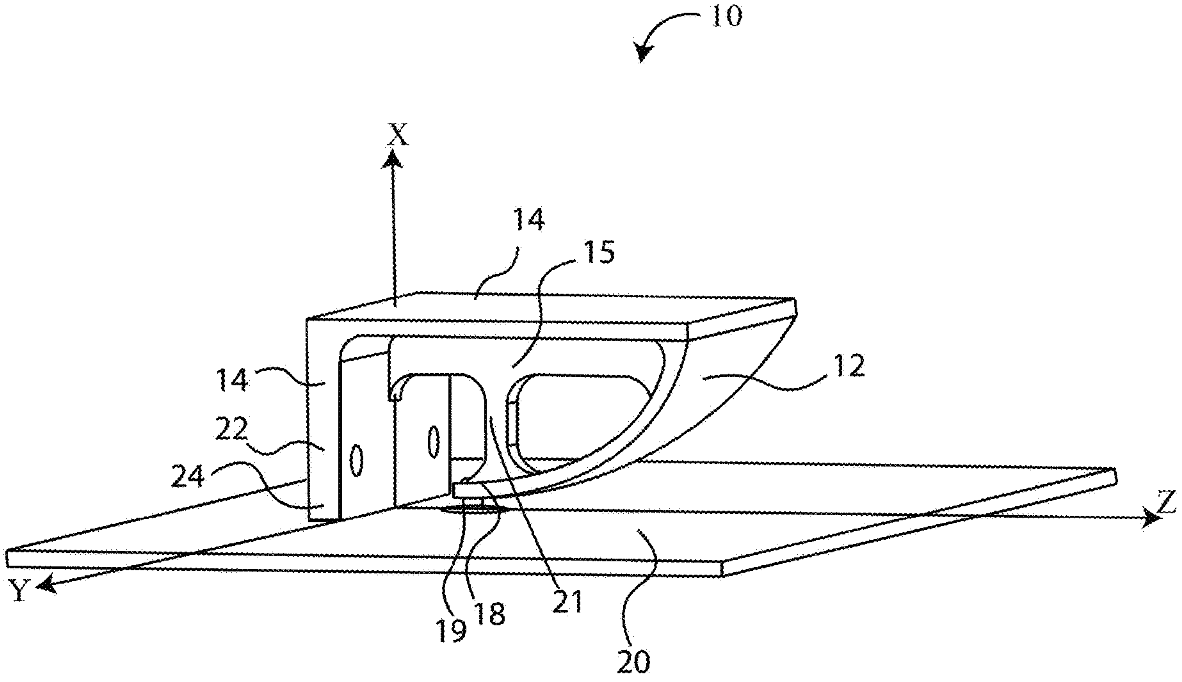
FIG. 4 is an isometric view of the compact UWB antenna mounted on a conductive ground surface along a Cartesian Coordinate system.

As best shown in FIG. 4, the compact UWB antenna 10 further includes a feed point 18 at a junction between the second end portion 17 of the flare section 12 and the rib section 15. The compact UWB antenna 10 can be fed with a coaxial connector 19, as best shown in FIGS. 2-4. The coaxial connector 19 is typically an SMA connector and is soldered to the compact at UWB antenna 10 at the feed point 18. The coaxial connector 19 may transmit electric currents, or more specifically electromagnetic currents such as radio frequency (RF) currents, to the compact UWB antenna 10. Further, the coaxial connector 19 may also receive electric currents from the compact UWB antenna 10 received from a source such as a transmitter or antenna, such as the compact UWB antenna. The compact UWB antenna 10 directs electromagnetic energy primarily in a forward direction which creates an antenna radiation pattern. Further, the center conductor of the coaxial connector 19 can be soldered to a bottom end portion of the flare section 12, and the outer conductor of coaxial connector 19 is simultaneously attached to the ground surface 20 creating a coaxial connection point. In the preferred embodiment, the rib section 15 provides mechanical structure to the compact UWB antenna 10. Specifically, the rib section 15, as best shown in FIG. 4, has a vertical portion 21 that spans from a top portion of the inductive corner section 14 to the second end 17 portion of the flare section 12, which immobilizes the feed point 18 and makes a secure and strong connection between the coaxial connector 19 and the compact UWB antenna 10. Additionally, the rib section 15 stabilizes the compact UWB antenna 10 mechanically by demonstrating a mathematically calculated balance between small volume, weight, and mechanical strength.

In accordance with the preferred embodiments, the inductive corner section 14 includes a back vertical wall 22 that has a bottom portion 24, as best shown in FIG. 3. The inductive corner section 14 may mount to a conductive surface via, for example, mounting holes 26 that extend through the back vertical wall 22. FIGS. 2-4 illustrate how design of the inductive corner section 14 may be modified such that the compact UWB antenna 10 may be mounted to the conductive surface in a variety of ways. As shown in FIGS. 2 and 4, the compact UWB antenna 10 can be mounted to the ground surface 20 with a relatively horizontal orientation. As shown, the bottom portion 24 of the back vertical wall 22 may be affixed to the ground surface 20. When mounted, the back vertical wall 22 makes a conductive surface-to-surface connection to the ground surface 20. In an alternative embodiment (not shown), the compact UWB antenna 10 may be mounted to a conductive structure that is then mounted to the ground surface 20. In this non-illustrated embodiment, the coaxial connector 19 is mounted on a back portion of a ground surface. Alternatively, as shown in FIG. 3, the compact UWB antenna can be mounted to a conductive vertical wall 28 with a relatively vertical orientation that connects with the ground surface 20. In this embodiment, the coaxial connector 19 is similarly mounted on a back portion of the adjoining ground surface 20. The ground surface 20 enables the compact UWB antenna 10 of the present disclosure to properly transmit and receive electromagnetic currents. As one with ordinary skill would understand, a ground surface can be a copper material or any known conductive material in the art. In the preferred embodiments the compact UWB antenna 10 mounts on a surface that is planar; however, as one skilled in the art would understand, the surface that the compact UWB antenna 10 mounts to may not be planar.

The plurality of sub-radiator segments, collectively, enable the compact UWB antenna 10 to operate over a wide operational frequency range. Further, the plurality of sub-radiator segments each contribute to a different optimal frequency range of operation. More specifically, each of the plurality of sub-radiator segments 12, 14, 15 have an optimal frequency range within the wide operational frequency range that radiation distribution is optimized at such that each sub-radiator segments optimizes propagation of electromagnetic waves of the wide operational frequency range. For the purpose of this disclosure, the wide operational frequency range for the preferred embodiments of the compact UWB antenna is a wide 2-18 GHz frequency range. When a designated frequency is within upper frequencies (e.g. 6-18 GHz of the 2-18 GHz frequency range), the frequencies are within a high frequency range. Other frequency ranges are characterized by a mid-frequency portion (e.g. 4-6 GHz of the 2-18 GHz frequency range) and lower frequency portion (e.g. 2-4 GHz of the 2-18 GHz frequency range), which are a mid-frequency range and a low frequency range. The mid-frequency range combines characteristics that define how the compact UWB antenna 10 operates during the high frequency range and the low frequency range. Each optimal frequency range further corresponds to specific sub-radiator segment(s) that is/are predominantly active in propagation of the electromagnetic currents transmitted by the coaxial connector 19 to the compact UWB antenna 10. Each one of the plurality of sub-radiator segments is considered active (e.g. propagating electromagnetic waves) during its optimal frequency range. However, the plurality of sub-radiator segments are not completely inactive when operating outside their respective optimized frequency range, as one with skill in the art would understand. That is, although one of the plurality of sub-radiator segments may not be functionally optimized to propagate, the sub-radiator segment still contributes to receiving electromagnetic currents.

Figure 5:
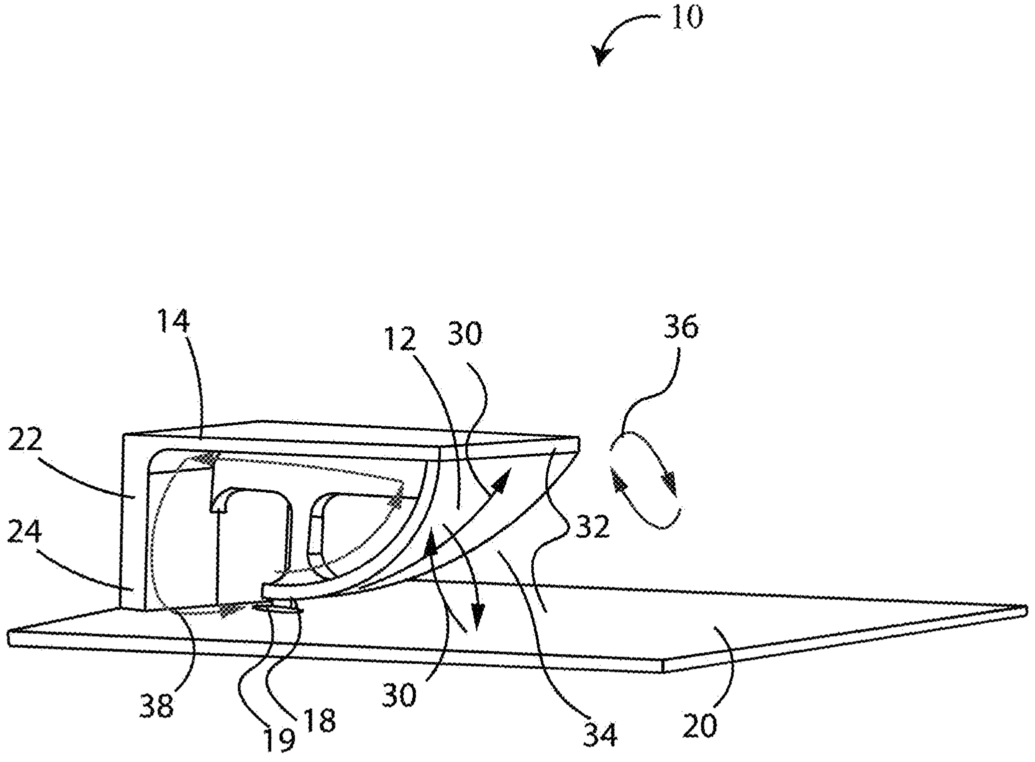
FIG. 5 is an illustration of paths of electromagnetic currents within a high frequency range and a low frequency range along the compact UWB antenna.

The section of the compact UWB antenna 10 that is predominantly active in the high frequency range is the flare section 12. The flare section 12 has a curved parabolic surface and may be generally described as a half of a TEM surface horn antenna, as will be explained in further detail below. Within the high frequency range, the flare section 12 is predominantly utilized for operation of the compact UWB antenna 10. As shown in FIG. 5, black arrows of FIG. 5 represent electromagnetic currents 30 produced within the high frequency range. The electromagnetic currents 30 travel along the surface of the flare section 12, which extends generally upward in a parabolic shape, until they are attenuated (reduced in value) rapidly, which generally occurs when the electric fields are decoupled from an opening mouth 32 of the compact UWB antenna 10. The opening mouth 32 is defined by a free space 34 between the flare section 12 and the ground surface 20 and may describe a general direction outward from the compact UWB antenna 10. Electromagnetic currents 30 created at the feed point 18 are gradually travelling along the opening mouth 32 while making contact with both the flare section 12 and the ground surface 20 and are finally decoupled from the flare section and the ground surface. In the preferred embodiments, electromagnetic currents start decoupling from the flare section 12 at a wavelength four times longer than a distance from a top edge of the flare section to the ground surface 20. As the electromagnetic currents decouple, the electromagnetic currents morph into radiating waves 36 (e.g. a travelling wave antenna concept) with a spherical wave propagation, as shown by purple arrows in FIG. 5. As one skilled in the art would understand, input impedance of the antenna should be close to the impedance of the coaxial connecter 19 to allow RF currents to transmit through the compact UWB antenna 10 and then radiate into space. In the preferred embodiments, the feed point 18 impedance exponentially increases to an impedance of the free space 34 at the end of the opening mouth 32. For example, impedance at the feed point is close to 50 ohm while the reactive part of the impedance is very small (close to zero). If input impedance is substantially different than 50 ohm, most RF energy transmitted by the coaxial connector 19 will be reflected back to a transmitting source and not radiated by the compact UWB antenna 10. Due to the impedance of the feed point 18, the flare section 12 is inherently capacitive at mid-range frequencies while the inductive corner section 14 is inductive. In other words, the design of compact UBW antenna 10 provides a balance between capacitive and inductive reactances to ensure efficient propagation at low and mid-frequencies.

At the high frequency range, electromagnetic radio frequency currents are not travelling to the inductive corner section 14. In other words, the inductive corner section 14 is not active during high frequency ranges and therefore does not transmit electromagnetic waves to the flare section 12, which could impede the electromagnetic waves' ability to propagate. The inductive corner section 14 has inductive reactance characteristics at the low-frequency range, and therefore helps balance the capacitive reactance of the flare section 12. The reactance characteristics of the inductive corner section 14 and the flare section 12 cancel each other (e.g., same magnitude but opposite directions) and provide a negligible input antenna reactance during the low frequency range. The low frequency range, as best seen in FIG. 5, is best represented by electromagnetic currents 38 travelling in a loop fashion as shown by red arrows. Further, the low frequency range can be represented by direction of the electromagnetic currents 38, which start at the coaxial connector point, extend parabolically along the surface shape of the flare section 12, extend along the horizontal portion of the inductive corner section 14, and end at a bottom portion 24 of the back vertical wall 22 of the inductive corner section, which mounts to the ground surface 20.

Figure 6:
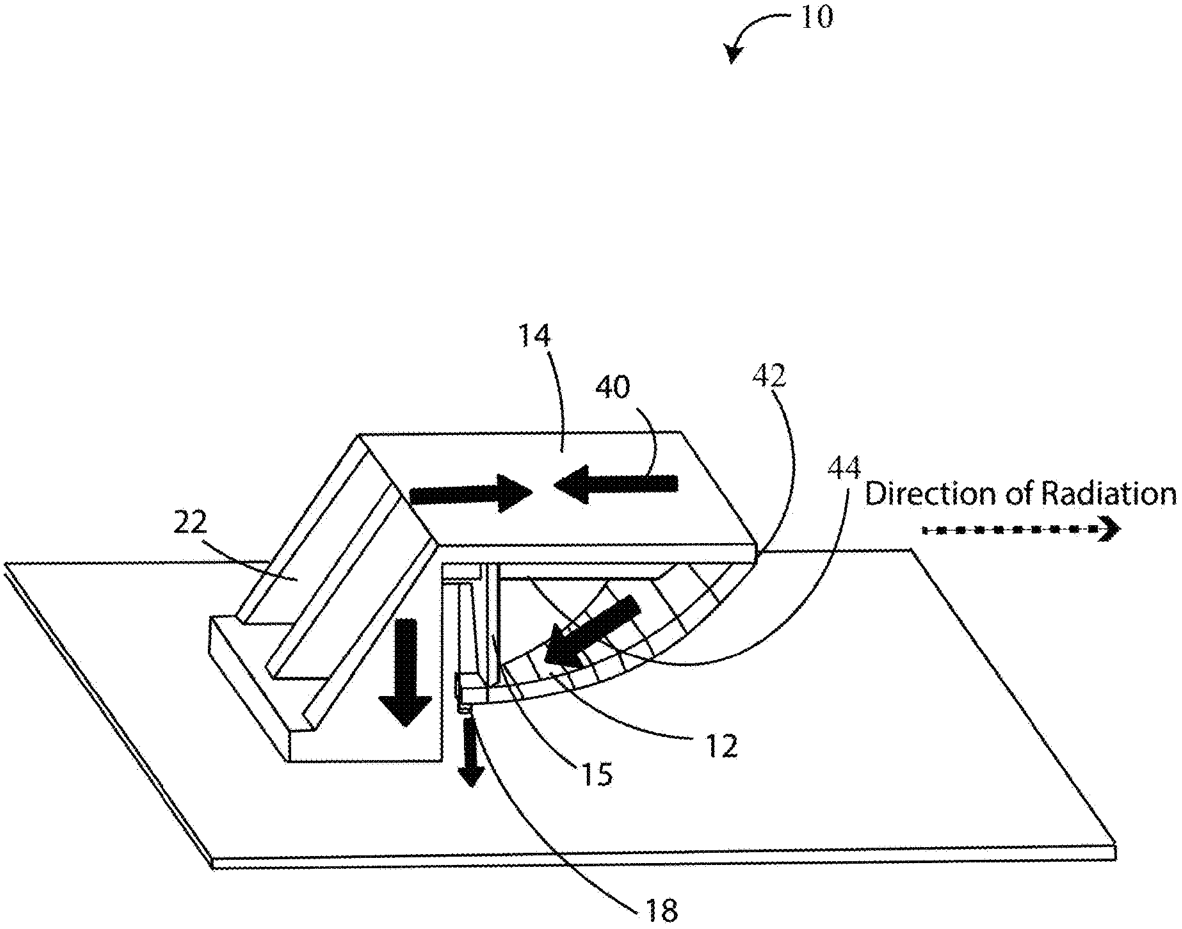
FIG. 6 is an illustration of a path of electromagnetic current within a mid-frequency range along the compact UWB antenna and an illustration of direction of radiation.
Figure 7:
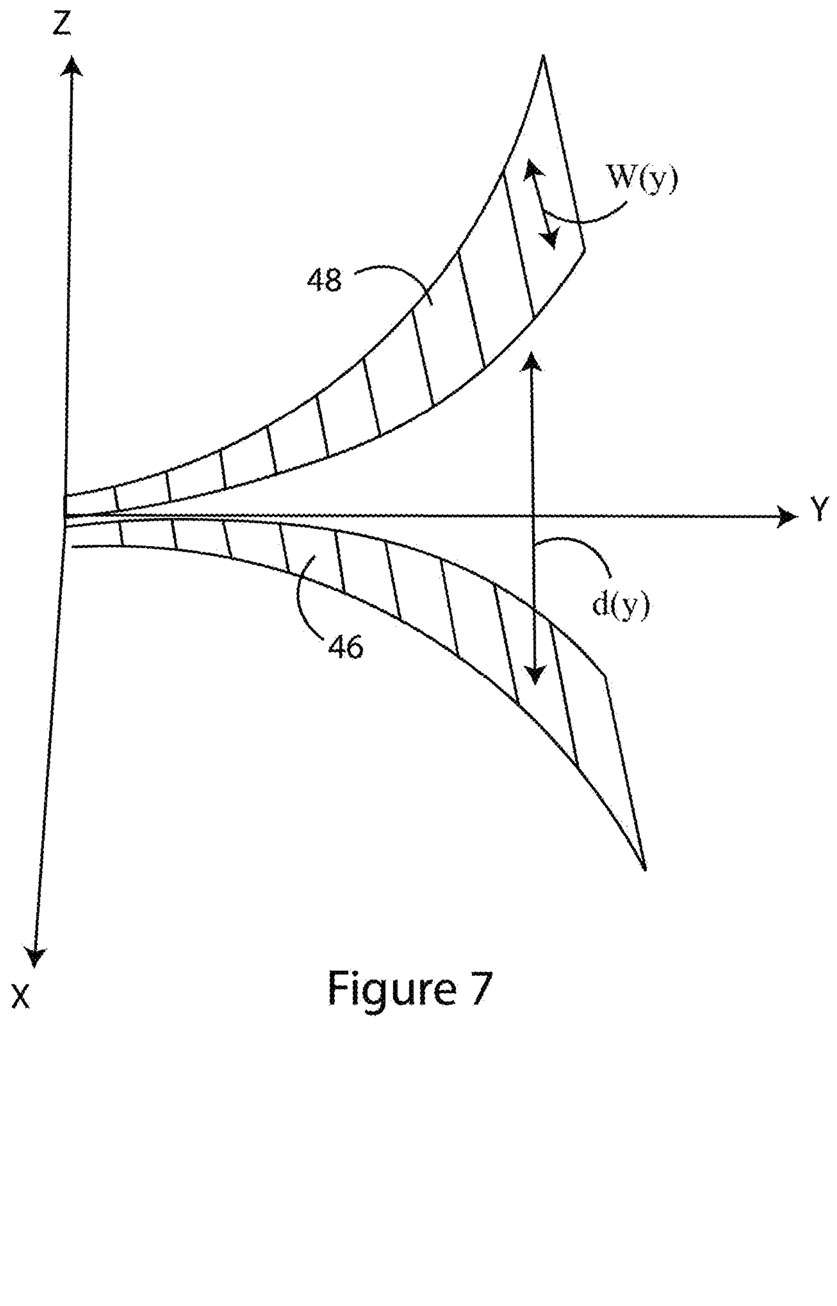
FIG. 7 is an illustration of a TEM surface horn.

At the mid-frequency range, a path of the radiofrequency (RF) currents 40 flows in a loop formation similar to the low frequency range, but the electrical length is larger in wavelength, as illustrated in FIG. 6. The phases of electromagnetic currents along the loop formation of the RF currents 40 are such that the induced fields that the currents create add constructively to the desired direction of propagation. As shown in FIG. 6, the desirable direction of propagation is a generally outward, forward direction from an edge portion 42 of the flare section 12 and inductive corner section 14. Further, the inductive corner section 14 creates the portion of the low frequency range that operates at around generally 3 GHz. Length of the inductive corner section 14 is calculated to create an optimal half wavelength loop antenna at around 3 GHZ. Length of each one of surfaces 46, 48 of the TEM surface horn, as shown in FIG. 7, can be equal to 50 mm which is half the wavelength at 3 GHZ. Surface shape of the TEM surface horn includes the flare section 12, which can be described with exponential equations for parametric x and y directions with z direction, as shown in FIG. 7 (starting from the feed point 18 as shown in FIG. 6) as an independent variable via the following equations:

$$Z_{IMP}(y) = Z_0 \cdot e^{ay} \tag{1}$$

$$\text{where } a = \frac{1}{L}\ln\left(\frac{n_o}{Z_o}\right) \tag{2}$$

where $Z_{IMP}$ is a wave impedance along the y-dimension, $n_o$ is an intrinsic impedance in free space 34 ($n_o$=377 Ω), $Z_o$ is a characteristic impedance ($Z_o$=100 Ω), and L is an overall length of the flare section 12 in the y direction.

$$d(y) = d_0 \cdot e^{by} \tag{3}$$

$$\text{where } b = \frac{1}{L}\ln\left(\frac{d_l}{d_o}\right) \tag{4}$$

Where d(y) is the vertical distance between two the two surfaces 46, 48 of the TEM surface horn antenna along the y-dimension and d, is the distance between the TEM surfaces as the feed point 18 y=0.

$$w(y) = \frac{d(y) \cdot n_o}{Z_{IMP}(y)} \tag{5}$$

Where w(y) is a width of the TEM surface along the y-dimension.

The rib section 15 provides an alternative path for RF currents 40 to travel to the conductive surface through the back vertical wall 22. By positioning the rib section 15 strategically, RF currents 40 are weak due to attenuation and do not significantly interfere with the desirable operation (e.g., direction of current, gain, and input impedance) of the compact UWB antenna 10. An upper portion of the rib section 15, more specifically, a rib area parallel to a top portion of the compact UWB antenna 10, due to its shape and design can attenuate undesirable electromagnetic fields with high frequency RF current that starts developing from electromagnetic currents within a low frequency range loop.

Figure 8:
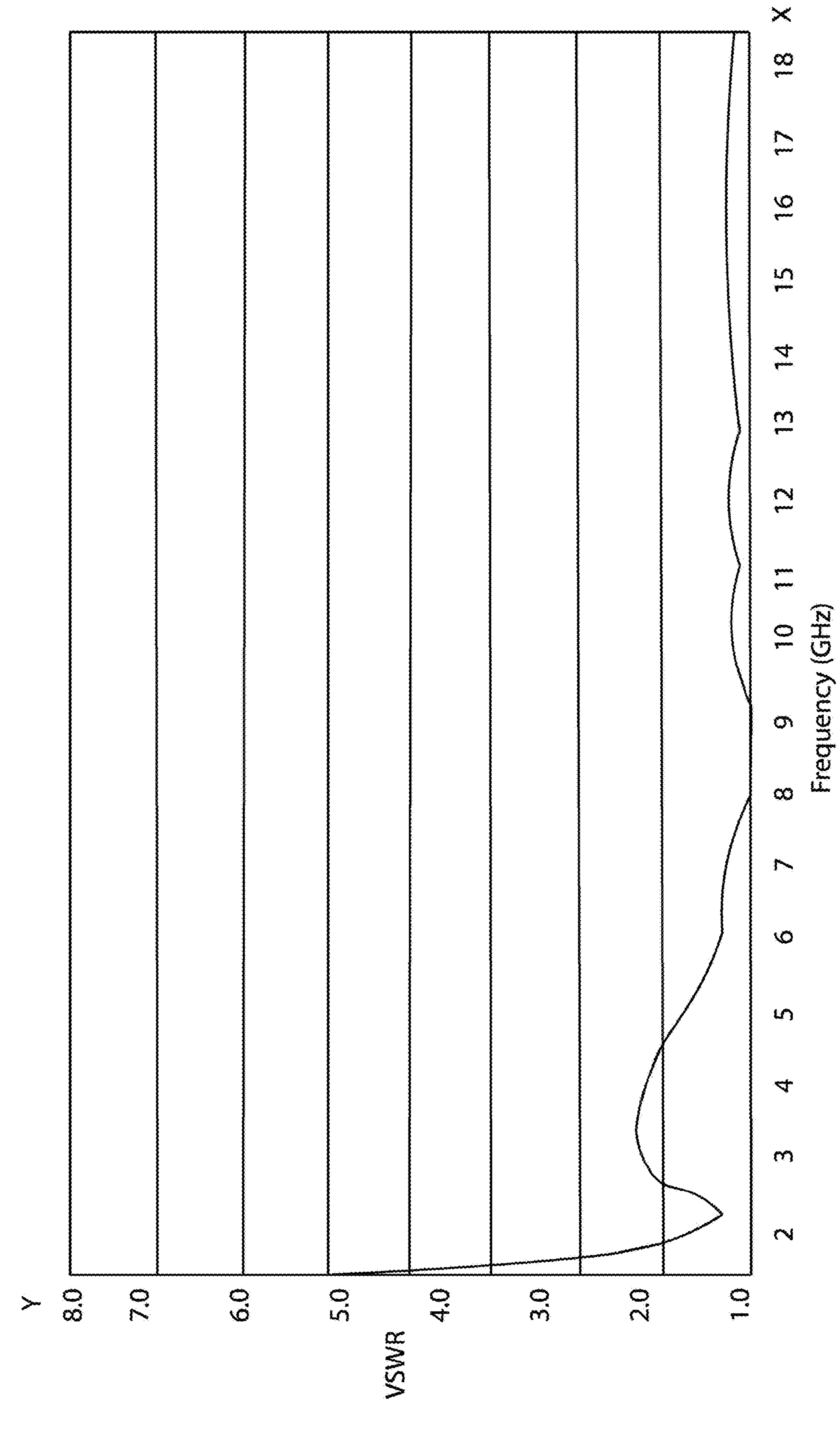
FIG. 8 is an illustration of a Voltage Standing Wave Ratio (VSWR) of the compact UWB antenna.
Figure 9:
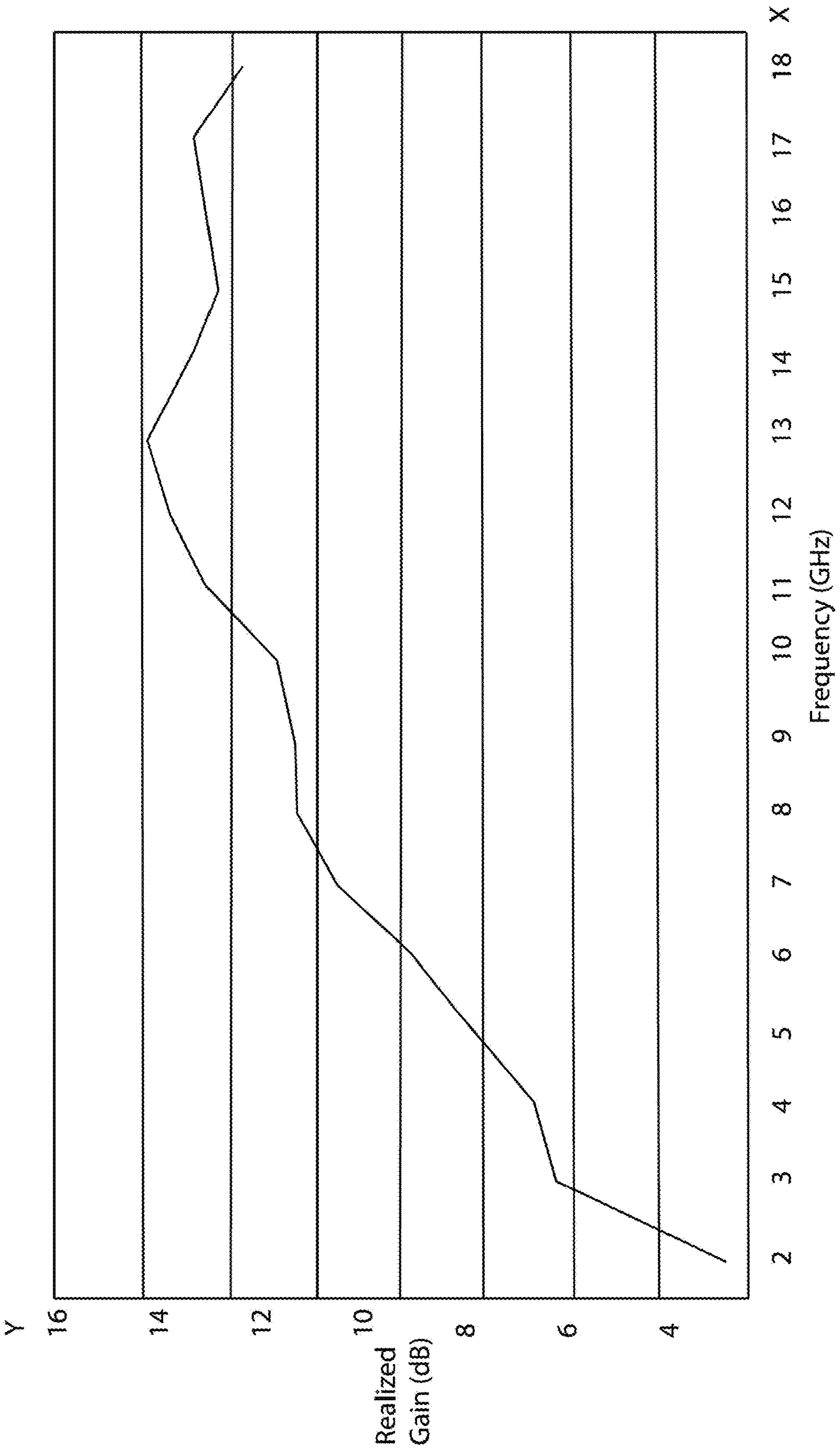
FIG. 9 is a graphical representation of a simulated antenna gain versus frequency with a 2-18 GHz operational frequency range.

In accordance with the preferred embodiment, FIG. 8 shows a Voltage Standing Wave Ratio (VSWR) of the compact UWB antenna 10 at the feed point 18 versus frequency. The VSWR measures how efficiently radio-frequency power is transmitted to an antenna by a function of a reflection coefficient. A reflected voltage wave is produced by an antenna that is not matched to a receiver, such that power is reflected. The reflected voltage wave creates standing waves along the transmission line, resulting in peaks and valleys as seen in FIG. 8. If the VSWR=1.0, there would be no reflected power, and the voltage would have a constant magnitude along a transmission line. As one with ordinary skill in the art would understand, a good impedance match is of a VSWR<2. As shown in FIG. 8, the compact UWB antenna has a near 1.0 VSWR. Further, FIG. 9 shows Realized Gain (in dB) of the compact UWB antenna versus frequency. Realized Gain takes mismatch loss occurrence into account, such that loss due to mismatching is subtracted from the gain of the antenna to yield a realized gain. Realized gain reveals how much signal will be available at input to a receiver for a given field strength.

Figure 10:
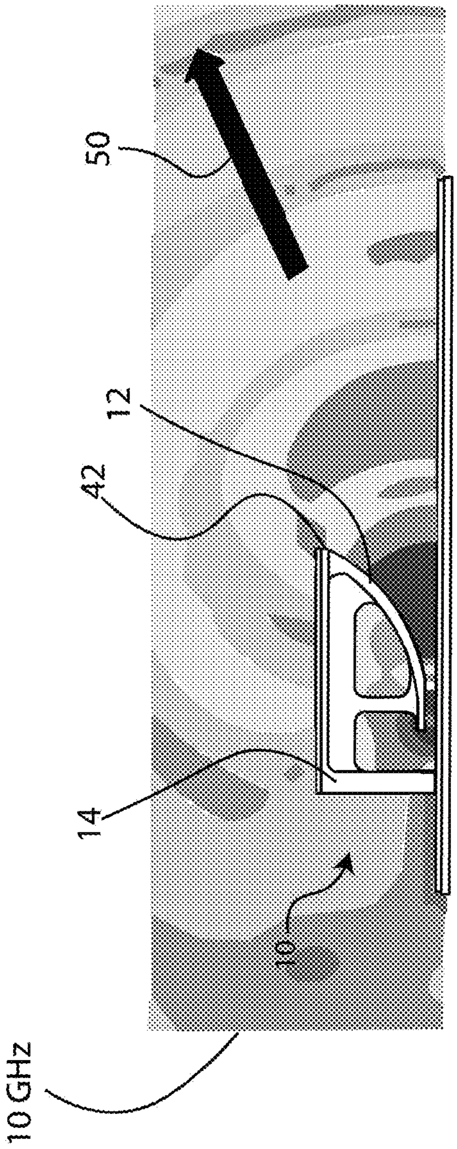
FIG. 10 is an illustration of a simulated electric field strength of the antenna element at 10 GHz.
Figure 11:
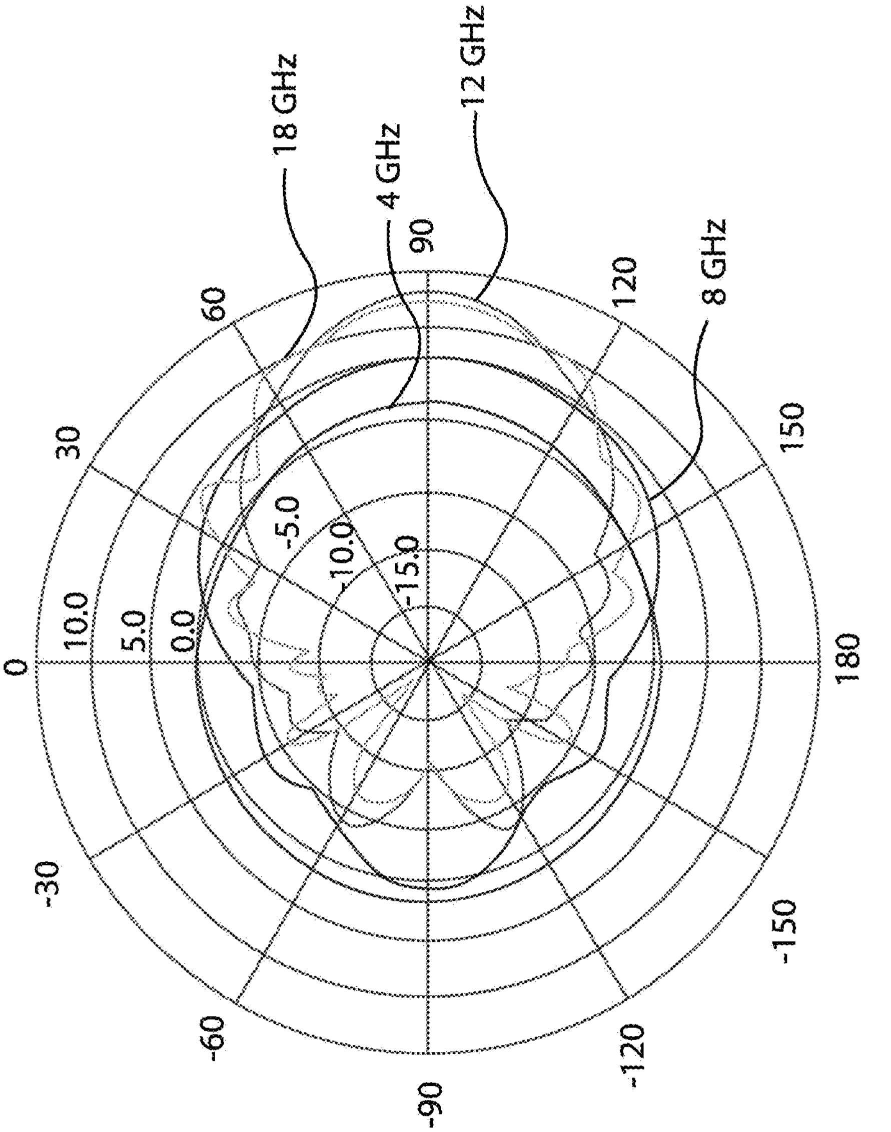
FIG. 11 is a graphical illustration of azimuth radiation patterns at 4 GHz, 8 GHz, 12 GHz, and 18 GHz.
Figure 12:
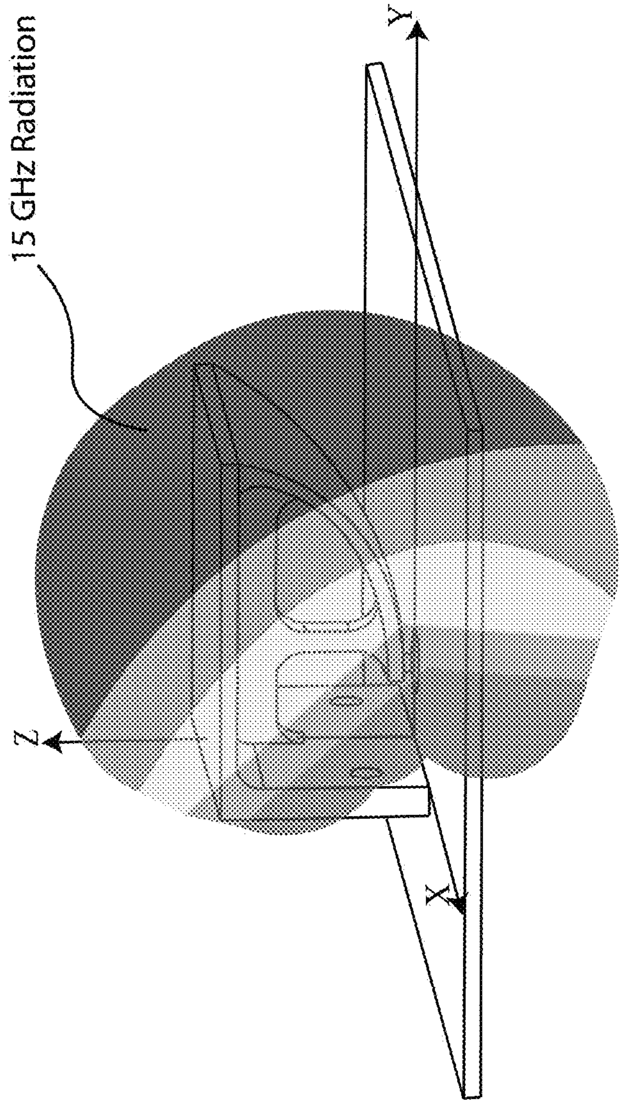
FIG. 12 is an illustration of a 3D radiation pattern at 15 GHz.

FIG. 10 is an example illustration of a simulated electric field strength at 10 GHz. Electric Field strength of a transmitted signal is measured in terms of gain, which refers to direction of maximum radiation 50. As shown in FIG. 10, the direction of max radiation 50 is generally in an outward direction from the edge portion 42 of the flare section 12 and the inductive corner section 14. Further, as shown in FIG. 11, maximum radiation can be viewed in an elevation radiation plot. Elevation radiation plots are a cross sectional representation of an antenna radiation pattern at an eye level with an access point from an angle on the horizon. FIG. 11 graphically represents 4 GHZ, 8 GHZ, 12 GHz, and 18 GHz frequencies that produce a high, positive gain with a forward directing radiating beam. For the preferred embodiments of the compact UWB antenna 10, frequencies within the low frequency range, the mid-frequency range, and the high frequency range generally produce high, positive gain and forward coverage. Similarly, FIG. 12 illustrates a three-dimensional radiation pattern at 15 GHz with nearly spherical shape. Near spherical patterns represents an ideal radiation pattern for an antenna. For the preferred embodiments of the compact UWB antenna 10, frequencies in the low frequency range, the mid-frequency range, and the high frequency range generally produce near spherical radiation patterns.

For the purpose of this disclosure, dimensions of the compact UWB antenna 10 can be specified on a Cartesian Coordinate system as best shown in FIG. 4. For example, length of the compact UWB antenna 10 along Z axis can be 24 mm, width along Y axis can be 22 mm, and height along X axis can be 12 mm. The height of the compact UWB antenna 10 can be 12 mm as maximum allowable when the size of the compact UWB antenna 10 is measured in wavelengths at the low-frequency range, e.g. 2 GHz and is very small: 0.15× 0.15×0.08 wavelengths=0.002 wavelengths3.

In accordance with the present disclosure, the preferred embodiment of the compact UWB antenna 10 is optimized to operate over the 2-18 GHz frequency range. As such, dimensions and characteristics disclosed in the present disclosure represent the preferred embodiments of the compact UWB antenna 10 and are representative of frequency range chosen. However, design of the compact UWB antenna 10 is scalable in size and can be optimized to operate at different frequencies ranges with a similar fractional frequency range. The ultra-wideband antenna 10 is suitable for applications with high forward gain, wide frequency range, and a relatively low profile while still achieving optimal impedance match over an entire operational frequency range of 2-18 GHz.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Further, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. An ultra-wide band antenna comprising:

A plurality of sub-radiator segments, the plurality of sub-radiator segments collectively being configured to direct electromagnetic energy primarily in a forward end-fire direction, the plurality of sub-radiator segments defining:

a flare section, wherein the flare section comprises a curved parabolic surface having first and second ends, the first end connecting to an inductive corner section and the section end spaced from the inductive corner section and connecting to a rib section;

an inductive corner section, wherein the inductive corner section is configured to mount to a ground surface;

the rib section, the rib section connecting the inductive corner section and Flare section, the rib section being configured to provide a path for radiofrequency (RF) current, the rib section further being configured to attenuate undesirable electromagnetic fields with high frequency RF current.

2. The ultra-wide band antenna of claim 1, the path comprising a ground portion of the ground surface, wherein the ground portion is configured to receive RF current.

3. The ultra-wide band antenna of claim 1, further comprising a feed point.

4. The ultra-wide band antenna of claim 3, wherein the feed point is configured to receive a coaxial connector.

5. The ultra-wideband antenna of claim 1, wherein the plurality of sub-radiator segments collectively have three frequency ranges within a wide frequency range of the ultra-wideband antenna.

6. The ultra-wideband antenna of claim 5, wherein one of the three frequency ranges is a high frequency range, the high frequency range being an upper portion of a wide frequency range.

7. The ultra-wideband antenna of claim 5, wherein one of the three frequency ranges is a low frequency range, the low frequency range comprising a lower portion of the wide frequency range.

8. The ultra-wideband antenna of claim 5, wherein one of the three frequency ranges is a mid-frequency range, the mid-frequency range comprising a mid-portion of the wide frequency range.

9. The ultra-wideband antenna of claim 5, the wide frequency range being 2 GHz to 18 GHz.

10. The ultra-wideband antenna of claim 5 configured to operate over the wide frequency range with good impedance match.

11. The ultra-wideband antenna of claim 5, the UWB antenna configured to operate over the wide frequency range with high forward gain.

12. The ultra-wideband antenna of claim 5, the UWB antenna configured to operate over the wide frequency range with good impedance match.

13. The ultra-wideband antenna of claim 5, the UWB antenna configured to operate over the wide frequency range with a partially stable phase center.

14. The ultra-wideband antenna of claim 5, the UWB antenna configured to operate over the wide frequency range with a consistent radiation performance.

15. The ultra-wideband antenna of claim 1, wherein the UWB antenna is of a monolithic material.

16. The ultra-wideband antenna of claim 15, wherein the monolithic material is metallic.

17. The ultra-wideband antenna of claim 15, wherein the monolithic material is aluminum.

18. The ultra-wideband antenna of claim 1, where the antenna has no dielectric losses and low conductive losses.

19. The ultra-wideband antenna of claim 1, where the antenna operation is insensitive to extreme temperature variations.

20. The ultra-wideband antenna of claim 1, where the antenna is 0.002 $lambda^3$ at low frequency.

* * * * *